US011712838B2

(12) United States Patent
Ghioni et al.

(10) Patent No.: US 11,712,838 B2
(45) Date of Patent: Aug. 1, 2023

(54) DYNAMIC BALANCING OF ADDITIVELY MANUFACTURED IMPELLERS

(71) Applicant: Microsoft Technology Licensing, LLC, Redmond, WA (US)

(72) Inventors: Lincoln Matthew Ghioni, Redmond, WA (US); Robert Ullman Myers, Kirkland, WA (US); Bo Dan, Redmond, WA (US); Andrew Douglas Delano, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 16/866,472

(22) Filed: May 4, 2020

(65) Prior Publication Data

US 2021/0001539 A1 Jan. 7, 2021

Related U.S. Application Data

(60) Provisional application No. 62/869,743, filed on Jul. 2, 2019.

(51) Int. Cl.
*B29C 64/124* (2017.01)
*B29C 64/264* (2017.01)
(Continued)

(52) U.S. Cl.
CPC .......... *B29C 64/124* (2017.08); *B29C 48/919* (2019.02); *B29C 64/10* (2017.08);
(Continued)

(58) Field of Classification Search
None
See application file for complete search history.

(56) References Cited

U.S. PATENT DOCUMENTS

2001/0025602 A1 10/2001 Trionfetti
2009/0123281 A1 5/2009 Taylor
(Continued)

FOREIGN PATENT DOCUMENTS

CN 86205741 U * 7/1987
CN 201180674 Y 1/2009
(Continued)

OTHER PUBLICATIONS

Machine English translation of JPH05180193A, Accessed Apr. 18, 2022 (Year: 1997).*
(Continued)

*Primary Examiner* — Jacob T Minskey
*Assistant Examiner* — Adrianna N Konves
(74) *Attorney, Agent, or Firm* — Ray Quinney & Nebeker P.C.; Paul N. Taylor

(57) ABSTRACT

A method of manufacturing an impeller for a thermal management device includes partially curing a curable liquid in a curable liquid bath to form a first stage rotor, removing the first stage rotor from the curable liquid bath, the first stage rotor having excess curable liquid on a surface thereof, rotating the first stage rotor to displace the excess curable liquid radially outward from a rotational axis to compensate for imbalances in the first stage rotor, and fully curing the first stage rotor and at least a portion of the excess curable liquid to produce a second stage rotor that is more rotationally balanced than the first stage rotor.

20 Claims, 5 Drawing Sheets

(51) Int. Cl.

| | | |
|---|---|---|
| *F04D 29/22* | (2006.01) | |
| *G06F 1/20* | (2006.01) | |
| *B29C 65/14* | (2006.01) | |
| *B29C 48/88* | (2019.01) | |
| *B29C 64/135* | (2017.01) | |
| *B29C 64/10* | (2017.01) | |
| *B29C 65/02* | (2006.01) | |
| *B29C 64/30* | (2017.01) | |
| *B33Y 80/00* | (2015.01) | |
| *B33Y 10/00* | (2015.01) | |

(52) U.S. Cl.
CPC .......... *B29C 64/135* (2017.08); *B29C 64/264* (2017.08); *B29C 64/30* (2017.08); *B29C 65/02* (2013.01); *B29C 65/1403* (2013.01); *B29C 65/1406* (2013.01); *F04D 29/22* (2013.01); *G06F 1/203* (2013.01); *B33Y 10/00* (2014.12); *B33Y 80/00* (2014.12)

(56) References Cited

U.S. PATENT DOCUMENTS

| | | | |
|---|---|---|---|
| 2011/0088841 A1* | 4/2011 | Thunhorst | B29B 15/125 427/346 |
| 2017/0067470 A1 | 3/2017 | Patton et al. | |

FOREIGN PATENT DOCUMENTS

| | | | |
|---|---|---|---|
| CN | 108748973 A | | 11/2018 |
| JP | H05180193 A | | 7/1993 |
| WO | WO1989008021 A1 | * | 9/1989 |

OTHER PUBLICATIONS

Machine English translation of CN86205741, Accessed Apr. 18, 2022 (Year: 1987).*
"International Search Report and Written Opinion Issued in PCT Application No. PCT/US20/040029", dated Oct. 5, 2020, 13 Pages.
"Auxiliary Systems", Retreived From: http://scholar.googleusercontent.com/scholar?q=cache:4I6ICFh5-asJ:scholar. google.com/+%22impeller%22+%22balancing%22+%22Coat%22+%22Resin%22 &hl=en&as_sdt=1,5&as_vis=1, Apr. 1, /2014, 90 Pages.
"Pumps", Retreived From: https://web.archive.org/web/20150221082126/http:/www.exone.com/Industries-Applications/Applications/Pumps, Feb. 21, 2015, 2 Pages.
"The Next Generation of Impeller Manufacturing", Retrieved From: https://report.sulzer.com/ar17/en/the-next-generation-of-impeller-manufacturing/. Retrieved on Apr. 23, 2019, 5 Pages.
Chen, et al., "3D Printing of Ceramics: A Review", In Journal of the European Ceramic Society, vol. 39, Issue 4, Apr. 2019, pp. 661-687.
Reddy, Prudhvi, "Digital Light Processing (DLP)", Retrieved From: https://www.think3d.in/digital-light-processing-dlp-3d-printing-service-india/, Aug. 24, 2016, 5 Pages.
Uno, et al., "Development of the Floating Centrifugal Pump by Use of Non-Contact Magnetic Drive and Its Performance", In International Journal of Rotating Machinery, vol. 10, Issue 5, Jan. 1, 2004, pp. 337-344.

* cited by examiner

DYNAMIC BALANCING OF ADDITIVELY MANUFACTURED IMPELLERS

CROSS-REFERENCE TO RELATED APPLICATIONS

This application claims priority to and benefit of U.S. Provisional Patent Application No. 62/869,743, filed Jul. 2, 2019, which is hereby incorporated in its entirety.

BACKGROUND

Background and Relevant Art

Mobile electronic devices in daily usage are commonplace. To increase portability of many mobile electronic devices, components of the electronic device are reduced in size and positioned in smaller housings. Reducing the size of the components and reducing the size of the housing creates thermal management challenges. For example, in a conventional desktop computer, many electronic components, such as a processor, system memory, graphical processor, power supply, or other components generate heat, but the large housing allows airflow through the housing to cool the components.

In a laptop or other mobile electronic device, there is less volume for airflow, and hence more drag on the air. Active cooling is used to draw air or other cooling fluid over the heat-generating components to cool the electronic device during use. Balanced fan impellers provide a more smooth and quiet operation at high rotational speed. An unbalanced impeller is typically noisy, inefficient, and will lead to premature fan bearing failure.

Traditional methods of balancing impellers rely on subtractive methods such as machining or laser ablation, or by adding balancing weights (for large impellers). In both cases, the impeller is mounted on an instrument to measure balance while under rotation. The instrument determines how much material to add or remove from one side of the impeller to achieve a balanced rotation. Material can be removed in an automated fashion using laser ablation during rotation, or by machining while stationary. The process repeats until the impeller is satisfactorily balanced, with each additional iteration increasing time, cost, and resources.

BRIEF SUMMARY

The present disclosure describes fabrication and curation processes that allow for the production of balanced impellers. Such processes may replace or supplement traditional fabrication and curation processes. For example, a first stage (e.g., partially cured) impeller is fabricated via an additive manufacturing process. In this example, the first stage impeller is rotated while at least partially coated in a curable liquid. The rotation causes the curable liquid to redistribute on the first stage impeller to compensate for rotational imbalances in the first stage impeller. In this example, after the curable liquid has redistributed, it is cured in place to produce a second stage (fully cured) impeller that is rotationally balanced or more rotationally balanced than the first stage impeller.

According, in some implementations, a method of manufacturing an impeller for a thermal management device includes partially curing a curable liquid in a curable liquid bath to form a first stage rotor, removing the first stage rotor from the curable liquid bath, the first stage rotor having excess curable liquid on a surface thereof, rotating the first stage rotor to displace the excess curable liquid radially outward from a rotational axis to compensate for imbalances in the first stage rotor, and fully curing the first stage rotor and at least a portion of the excess curable liquid to produce a second stage rotor that is more rotationally balanced than the first stage rotor.

In some implementations, a method for manufacturing an impeller for a thermal management device includes obtaining a precursor rotor coated in a curable material, rotating the precursor rotor and curable material to displace at least a portion of the curable material radially outward from the rotational axis so as to compensate for radial imbalances in the precursor rotor; and curing the displaced portion of the curable material to the precursor rotor to form a second stage rotor, wherein the second stage rotor has better radial balance than the precursor rotor.

In some implementations, an impeller for use in a thermal management device includes a frame and a balancing material. The frame has a lattice structure and a rotational axis. The balancing material is positioned on an exterior surface of the frame and is distributed unevenly relative to the rotational axis so as to compensate for radial imbalances in the lattice structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2-1 is a perspective view of an implementation of an impeller of an active thermal management device;

FIG. 2-2 is a perspective view of another implementation of an impeller of an active thermal management device;

DETAILED DESCRIPTION

As electronic devices become thinner, traditional fan designs have become increasingly inefficient. Additive manufacturing can realize new fan impeller architectures and geometries, allowing improvements in efficiency.

Additive manufacturing affords new fan geometries previously impossible by conventional manufacturing methods such as injection molding or computer number controlled (CNC) machining. With additive manufacturing, it is possible to create fan impeller shapes with undercuts, overhangs, textures, and complex lattice structures that would result in a die-locked mold, or inaccessible features that cannot be machined by CNC.

Additive manufacturing encompasses many different processes including examples such as Digital Light Processing (DLP) and Stereolithography (SLA), for example. DLP and SLA printers solidify a three-dimensional (3D) part layer by layer using controlled UV light and a bath of photocurable liquid resin. The resulting component emerges from the process coated in excess resin. Typically, this resin is washed away with a solvent and then the part is exposed to a high intensity UV light to finally cure any remaining uncured resin on the part.

The present application is related to using the waste resin coated on the surface of the impeller after printing to balance the impeller before final curing. After removal from the printer and before solvent cleaning, the impeller is mounted to a rotational balancing machine and contained within a protective enclosure. The impeller is rotated with increasing speed up to a maximum speed. Centrifugal forces acting on the resin cause the liquid to travel radially from the center of the impeller to the perimeter. Excess resin is ejected in droplets from the perimeter of the impeller and contained by the protective enclosure. The radial force causes the resin to distribute itself uniformly across the impeller surfaces, balancing the entire solid-liquid mass.

When a balanced (or more balanced) state is achieved, the spinning part is exposed to high intensity UV light, solidifying the remaining resin to form the cured shape of the impeller.

Accordingly, in some implementations, the method includes additively manufacturing a first stage rotor in a curable liquid bath by partially curing the curable liquid in layers. The excess curable liquid that remains on the first stage rotor after removing the first stage rotor from the curable liquid bath is used to balance the first stage rotor instead of washing the curable liquid off, drying the first stage rotor, and subsequently removing material to balance the rotor.

In some implementations, a frame of the rotor is formed and submerged into a curable liquid bath. The curable liquid that remains on the frame after removing the frame from the curable liquid bath is used to balance the rotor.

Figure 1:
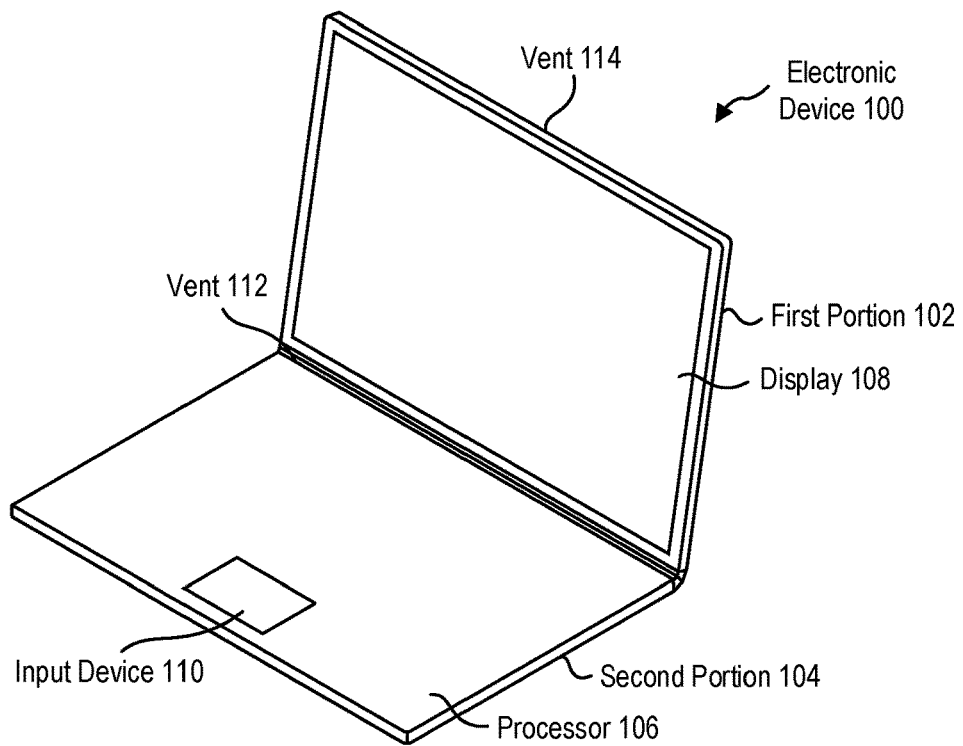
FIG. 1 is a perspective view of an electronic device with an active thermal management device.

FIG. 1 is a perspective view of an electronic device 100. In the context of this disclosure, the electronic device 100 is an example of a thinner device for which traditional fan designs have become inefficient. In some implementations, the electronic device 100 is a portable electronic device, such as a laptop, a smartphone, a tablet computer, a hybrid computer, a wearable electronic device (e.g., a head-mounted device, a smartwatch, headphones), or other portable electronic device. In some implementations, the electronic device 100 is an electronic device that is conventionally operated in a fixed location, such as a television, home theater, desktop computer, server computer, projector, optical disc player (e.g., CD player, DVD player, BLURAY player), video game console, or other electronic device.

FIG. 1 illustrates an implementation of an electronic device 100. The electronic device 100 includes a first portion 102 and a second portion 104 movably connected to one another. In implementations in which the electronic device is a hybrid computer, the first portion 102 includes the display 108 and at least a processor 106. In some implementations, a processor 106 is located in the second portion 104. In some implementations, the first portion 102 of the electronic device 100 includes a display 108 to present video information to a user and the second portion 104 of the electronic device 100 includes one or more input devices 110, such as a trackpad, a keyboard, etc., to allow a user to interact with the electronic device 100. The electronic device 100 further includes additional computer components, such as system memory, a graphical processing unit, graphics memory, speakers, one or more communication devices (such as WIFI, BLUETOOTH, near-field communications, cellular), peripheral connection points, hardware storage device(s), etc. In some implementations, the first portion 102 is removable from the second portion 104.

The electronic components of an electronic device 100, in particular the display 108, input device 110, processor 106, memory, and batteries, occupy volume, consume power, and generate thermal energy. In the example illustrated in FIG. 1 and in other examples, it is desirable that the electronic devices be thin and light for transport, while remaining powerful and efficient during use. The thermal energy generated by the electronic device 100, therefore, has little unobstructed volume inside the first portion 102 and/or second portion 104 through which air can flow. In some implementations, an active thermal management device with an impeller is used to actively move air in, out, or through the first portion 102 and/or second portion 104 to exhaust warm air from vents 112, 114.

Figures 1, 2:
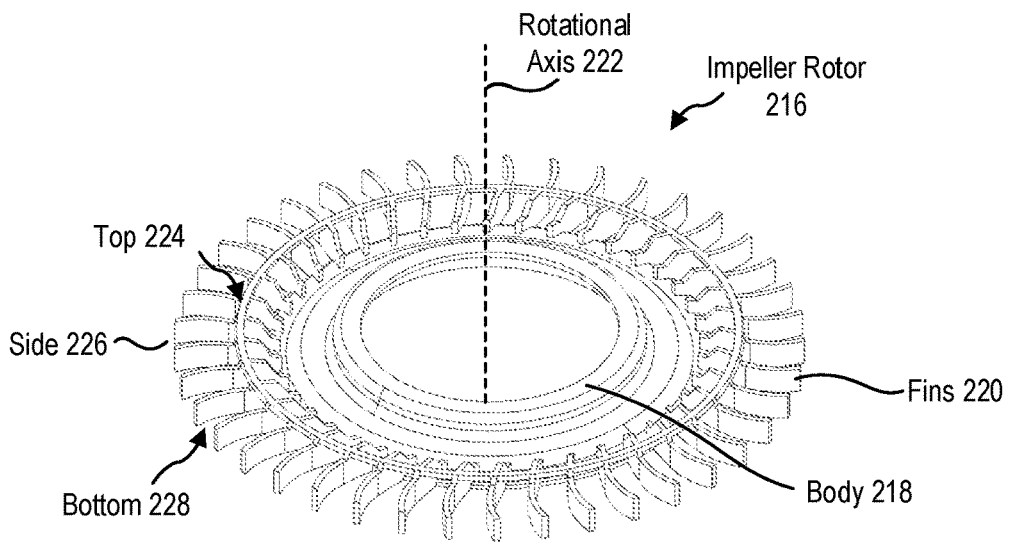
Figure 2:
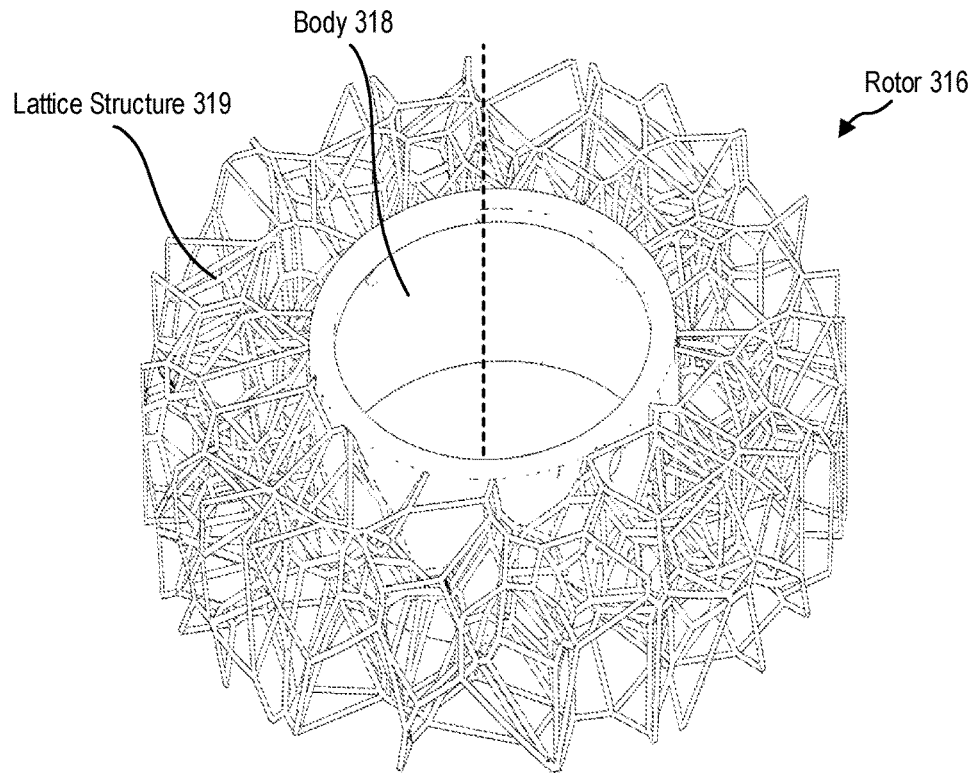

FIG. 2-1 is a perspective view of an impeller rotor 216 from a thermal management device in an electronic device, such as the electronic device 100 described in relation to FIG. 1. The rotor 216 has a body 218 and a plurality of fins 220 that project from the body 218. The rotor 216 is configured to rotate about a rotational axis 222. In some implementations, rotation of the rotor 216 around the rotational axis 222 draws air or other fluid past the body 218 and fins 220 as the fins 220 move. In some examples, the fins 220 draw the fluid in through a top 224 of the rotor 216 and the fins 220 and body 218 combine to direct the fluid out the side 226 of the rotor 216. In other example, the fins 220 draw the fluid in through a top 224 of the rotor 216 and the fins 220 and body 218 combine to direct the fluid out the bottom 228 of the rotor 216 opposite the top 224.

In some implementations, a rotor 216 is built by additive manufacturing or three-dimensional (3D) printing. For example, a rotor 216 is "printed" by applying and solidifying layers of material through many iterations, with each printed layer changing to cumulatively build the desired shape. Additive manufacturing allows new fan geometries that were previously impossible or unviable by conventional manufacturing methods such as injection molding or subtractive machining Additive manufacturing of the rotor 216 allows fan impeller shapes with undercuts, overhangs, textures, and complex lattice structures that would result in a die-locked mold (using injection molding) or inaccessible features that cannot be machined (such as using CNC machining).

Referring now to FIG. 2-2, in some implementations, the rotor 316 is formed using DLP or SLA without conventional fins, that uses a porous lattice structure 319 to move air or other fluid. In some examples, the body 318 and lattice structure 319 are additively manufactured on a substrate. In other examples, the lattice structure 319 are additively manufactured on a body 318 that is manufactured by another process, such as injection molding and/or machining Additive manufacturing can leave an uneven surface and/or an imbalanced rotor 316 (e.g., an imbalanced lattice structure 319) that needs to be smoothed and/or balanced before use in a thermal management device or other application.

In some implementations, DLP and SLA printers solidify a rotor 316 layer by layer using controlled UV light and a bath of photocurable liquid resin or other curable material. The resulting component emerges from the process coated in excess curable material. Conventionally, the excess curable material is washed away with a solvent and then the part is exposed to a high intensity UV light to finally cure any remaining uncured resin on the part. Removing the excess curable material from an SLA or a DLP part by solvent washing is costly and wasteful. By using the waste surface resin to balance the impeller, the processing time and cost of the part are reduced.

Figure 3:
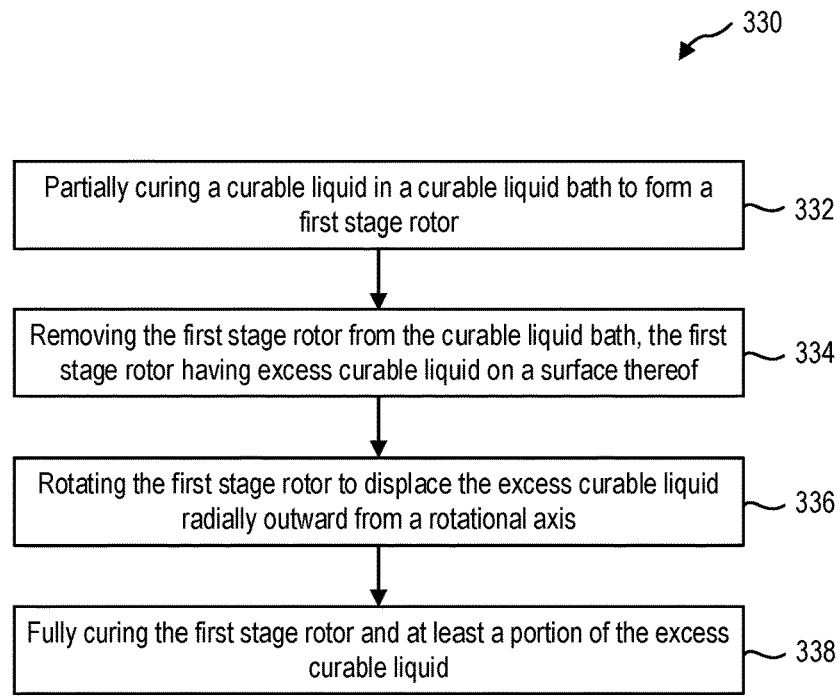
FIG. 3 is a flowchart illustrating a method of manufacturing a balanced impeller.

FIG. 3 is a flowchart illustrating an implementation of a method of manufacturing an impeller rotor for a thermal management device. In some implementations, the method 330 includes partially curing a curable liquid in a curable liquid bath to form a first stage rotor at 332. In some examples, the first stage rotor is formed by DLP or SLA of a curable liquid. In some implementations, the curable liquid is a cross-linking resin. In some implementations, the curable liquid is a urethane. In some implementations, the curable liquid is an epoxy. In at least one implementation, the curable liquid is a cyanate ester.

Partially curing the curable liquid includes curing the curable liquid to a state less than a full cure. In some implementations, partially curing the curable liquid includes exposing the curable liquid to an energy source for less than ten seconds. In some implementations, partially curing the curable liquid includes exposing the curable liquid to an energy source for less than five seconds. In some implementations, partially curing the curable liquid includes exposing the curable liquid to an energy source for less than three seconds.

In some implementations, the energy source for partially curing the curable liquid is ultraviolet light. In some implementations, the energy source for partially curing the curable liquid is infrared light. In some implementations, the energy source for partially curing the curable liquid is generated by a laser. In some implementations, the energy source is generated by a heat lamp. In some implementations, the energy source for partially curing the curable liquid is generated by an LED.

In some implementations, the first stage rotor is solid. In some implementations, the first stage rotor has a lattice structure through at least a portion of the rotor and/or the volume of the body and/or fins. In some examples, the body has a lattice structure therein, while the fins are solid material with little or no voids in the material. In other examples, the body and fins have a lattice structure therein. In yet other examples, the body and fins are solid material with little or no voids in the material. In further examples, the body has a lattice structure with at least 10% voids, while the fins are solid material with less than 10% voids. In at least one example, the body has a lattice structure with at least 50% voids, while the fins are solid material with less than 5% voids. In some examples, the rotor has no traditional fins and/or body and includes a volume of lattice structure that is exposed to flow air when the lattice structure is rotated around an axis. In some examples, the rotor includes a body and a single lattice structure positioned on the body, such as described in relation to FIG. 2-2.

In some implementations, the lattice is a regular lattice. For example, the regular lattice repeats throughout at least a portion of the first stage rotor in a unit cell. In some implementations, the lattice is a stochastic lattice. For example, the lattice includes struts, where the strut length and/or orientation is at least partially random with respect to adjacent or neighboring struts. In some implementations, the lattice is a disordered lattice where each cell of the lattice has a different size and/or number of neighbors than neighboring lattice cells. The variation can be random or based upon an equation or statistical distribution.

The method 330 further includes removing the first stage rotor from the curable liquid bath, while the first stage rotor has excess curable liquid on an exterior surface of the first stage rotor at 334. In some implementations, excess curable liquid from the curable liquid bath is cohesively adhered to an exterior surface of the first stage rotor. In some implementations, excess curable liquid from the curable liquid bath is cohesively adhered to an exterior surface of at least some of the struts of the lattice of the first stage rotor.

The excess curable liquid is conventionally washed from the first stage rotor prior to balancing. The method 330 according to the present disclosure balances the first stage rotor using a portion of the excess curable liquid by rotating the first stage rotor to displace the excess curable liquid radially outward from a rotational axis at 336. In some implementations, the first stage rotor is rotated around a rotational axis such that a radially outermost edge of the first stage rotor rotates in a range having an upper value, a lower value, or upper and lower values including any of 1 meter per second (m/s), 5 m/s, 10 m/s, 20 m/s, 30 m/s, 40 m/s, 50 m/s, 60 m/s, or any values therebetween. In some examples, the radially outermost edge of the first stage rotor rotates at greater than 1 m/s. In other examples, the radially outermost edge of the first stage rotor rotates at less than 60 m/s. In yet other examples, the radially outermost edge of the first stage rotor rotates at between 1 m/s and 60 m/s. In further examples, the radially outermost edge of the first stage rotor rotates at between 5 m/s and 50 m/s. In yet further examples, the radially outermost edge of the first stage rotor rotates at between 10 m/s and 40 m/s.

The linear speed of the outermost edge is relative to the rotational speed and the diameter of the first stage rotor. In some implementations, a first stage rotor according to the present disclosure has a diameter in a range having an upper value, a lower value, or upper and lower values including any of 40 millimeters, 60 mm, 80 mm, 100 mm, 120 mm, 140 mm, or any values therebetween. In some examples, the diameter is greater than 40 mm. In other examples, the diameter is less than 140 mm. In yet other examples, the diameter is between 40 mm and 140 mm.

In some implementations, the rotational speed of the first stage rotor rotating around the rotational axis is 300 revolutions per minute (RPM), 1000 RPM, 2500 RPM, 5000 RPM, 7500 RPM, 10000 RPM, 12500 RPM, 15000 RPM, or any values therebetween. In some examples, a rotational speed of the first stage rotor rotating around the rotational axis is greater than 300 RPM. In other examples, a rotational speed of the first stage rotor rotating around the rotational axis is less than 15000 RPM. In yet other examples, a rotational speed of the first stage rotor rotating around the rotational axis is between 300 RPM and 15000 RPM. In further examples, a rotational speed of the first stage rotor rotating around the rotational axis is between 500 RPM and 12000 RPM. In yet further examples, a rotational speed of the first stage rotor rotating around the rotational axis is between 1000 RPM and 10000 RPM.

In some implementations, the first stage rotor is rotated around the rotation axis to spin the excess fluid radially outward and balance the first stage rotor by distributing the excess curable fluid across an exterior surface and/or within the lattice of the first stage rotor. In some implementations, the first stage rotor is rotated around the rotation axis continuously until the first stage rotor is rotationally balanced relative to the rotational axis. In some implementations, the first stage rotor is rotated in pulses until the first stage rotor is rotationally balanced relative to the rotational axis. In some implementations, the first stage rotor is rotated at varying rotational speeds until the first stage rotor is rotationally balanced relative to the rotational axis.

In some examples, the first stage rotor is positioned on a spindle or base when rotated around the rotational axis. In some implementations, the spindle and/or base has a pressure sensor positioned therein to measure any lateral force in a lateral direction relative to the rotational axis. When the first stage rotor is balanced relative to the rotational axis, the force sensor will read approximately zero lateral force. In some examples, a displacement sensor, such as a laser displacement sensor measures a displacement of the rotor relative to the rotational axis. When the first stage rotor is balanced relative to the rotational axis, the displacement sensor will read approximately zero lateral displacement. When the first stage rotor is rotationally balanced within a threshold, the remaining excess curable material is cured in place with the material of the first stage rotor.

The method 330 further includes fully curing the first stage rotor and at least a portion of the excess curable liquid at 338. In some implementations, the rotation of the rotor is stopped before fully curing the first stage rotor and at least a portion of the excess curable liquid. In some implementations, the first stage rotor and at least a portion of the excess curable liquid continues to rotate around the rotational axis while an energy source applies energy to the first stage rotor and at least a portion of the excess curable liquid to fully cure the first stage rotor and at least a portion of the excess curable liquid.

In some implementations, fully curing the first stage rotor and the remaining excess curable liquid includes exposing the first stage rotor and the remaining excess curable liquid to an energy source. In some implementations, the energy source is the same energy source used to partially cure the first stage rotor. In some examples, the fully curing the first stage rotor and the remaining excess curable liquid includes exposing the first stage rotor and the remaining excess curable liquid to an energy source for at least ten seconds. In other examples, fully curing the first stage rotor and the remaining excess curable liquid includes exposing the first stage rotor and the remaining excess curable liquid to an energy source for at least ten seconds from a first direction and at least ten seconds from a second direction.

In some implementations, the energy source used to fully cure the first stage rotor and the remaining excess curable liquid into the second stage rotor is a different energy source. In some examples, the energy source used to fully cure the first stage rotor and the remaining excess curable liquid is an ultraviolet light source. In other examples, the energy source is an infrared light source. In yet other examples, the energy source is a laser light source. In further examples, the energy source is a thermal energy source, such as a heat lamp. In some implementations, the first stage rotor and the remaining excess curable liquid fully cure in exposure to air or another gas.

In some implementations, fully curing the first stage rotor and the remaining excess curable liquid creates a second stage rotor that is solid and balanced. In some examples, the second stage rotor is a finished rotor. In some implementations, the second stage rotor has one or more coatings, parts, or other components affixed thereto to create a finished rotor.

Figure 4:
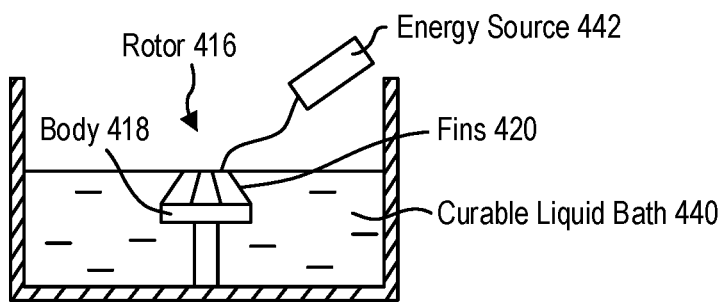
FIG. 4 is a schematic representation of a partially cured first stage rotor in a bath.

FIG. 4 is a schematic representation of a rotor 416 in a curable liquid bath 440. In some implementations, the body 418 and/or fins 420 of the rotor 416 are manufactured from the curable liquid bath 440 by exposure of the curable liquid to an energy source 442, such as an ultraviolet light source, an infrared light source, a laser light source, other energy sources, or combinations thereof. The body 418 and fins 420 are partially cured to create the first stage rotor, as described in relation to FIG. 3.

Figure 5:
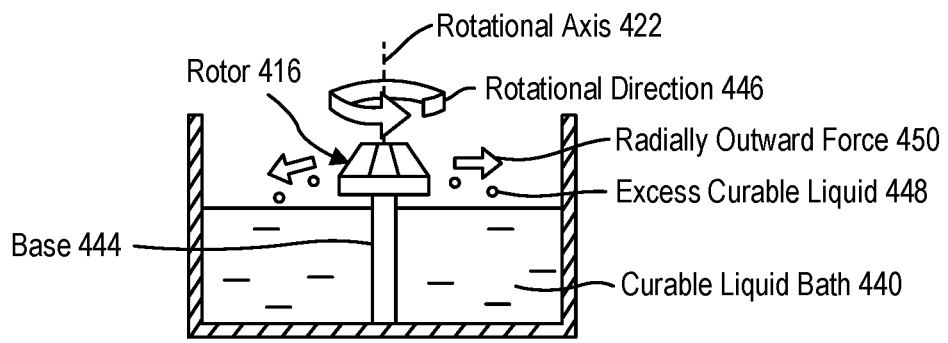
FIG. 5 is a schematic representation of balancing a first stage rotor.

FIG. 5 is a schematic representation of the rotor 416 of FIG. 4 removed from the curable liquid bath 440. In some implementations, the rotor 416 is removed from the curable liquid bath 440 by raising the rotor 416 on a base 444 or spindle above a surface of the curable liquid bath 440. The base 444 or spindle is rotatable around a rotational axis 422 that is shared with the rotor 416, rotating the rotor 416 in a rotational direction 446.

In some implementations, the rotation of the rotor 416 around the rotational axis 422 displaces at least a portion of excess curable liquid 448 from the rotor 416. The rotation movement of the rotor 416 and excess curable liquid 448 applies a radially outward force 450 to the excess curable liquid 448 relative to the rotational path of the rotor 416. In some implementations, the radially outward force 450 displaces at least a portion of the excess curable liquid 448 in or on the rotor 416 and at least a portion of the excess curable liquid 448 is removed from the rotor 416.

A portion of the excess curable liquid 448, therefore, can be removed without washing the rotor 416 in a solvent. In some implementations, the excess curable liquid 448 that is removed by rotating the rotor 416 is collected and reused. In some examples, the rotor 416 is rotated above the curable liquid bath 440 and the excess curable liquid 448 that is removed from the rotor 416 falls back into the curable liquid bath. After the rotor 416 is balanced by the remaining excess curable liquid 448, the rotor 416 and remaining excess curable liquid 448 is ready to be fully cured.

Figure 6:
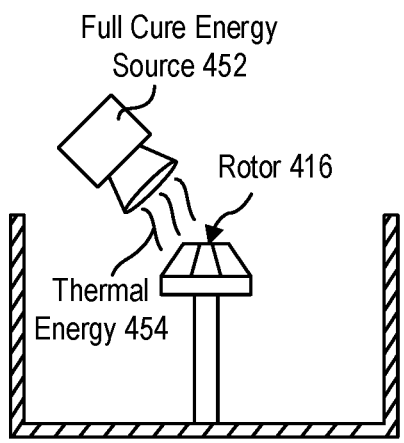
FIG. 6 is a schematic representation of fully curing the first stage rotor with an external energy source.

FIG. 6 is a schematic illustration of fully curing the rotor 416. In some implementations, fully curing the rotor 416 and the remaining excess curable liquid includes exposing the rotor 416 and the remaining excess curable liquid to full cure energy source 452. In some implementations, the full cure energy source 452 is the same energy source used to partially cure the first stage rotor. In some implementations, the full cure energy source 452 used to fully cure the rotor 416 and the remaining excess curable liquid into the second stage rotor is a different energy source. In some examples, the full cure energy source 452 is an ultraviolet light source. In other examples, the full cure energy source 452 is an infrared light source. In yet other examples, the full cure energy source 452 is a laser light source. In further examples, the full cure energy source 452 is a thermal energy source, such as a heat lamp, that applies a thermal energy 454 to the rotor 416 and remaining excess curable liquid. In some implementations, the rotor 416 and the remaining excess curable liquid fully cure in exposure to air or another gas.

In some implementations, fully curing the first stage rotor and the remaining excess curable liquid creates a second stage rotor that is solid and balanced. In some examples, the second stage rotor is a finished rotor. In some implementations, the second stage rotor has one or more coatings, parts, or other components affixed thereto to create a finished rotor. In some examples, the second stage rotor is balanced to within an intermediate threshold, and subsequent balancing improves the balance.

Figure 7:
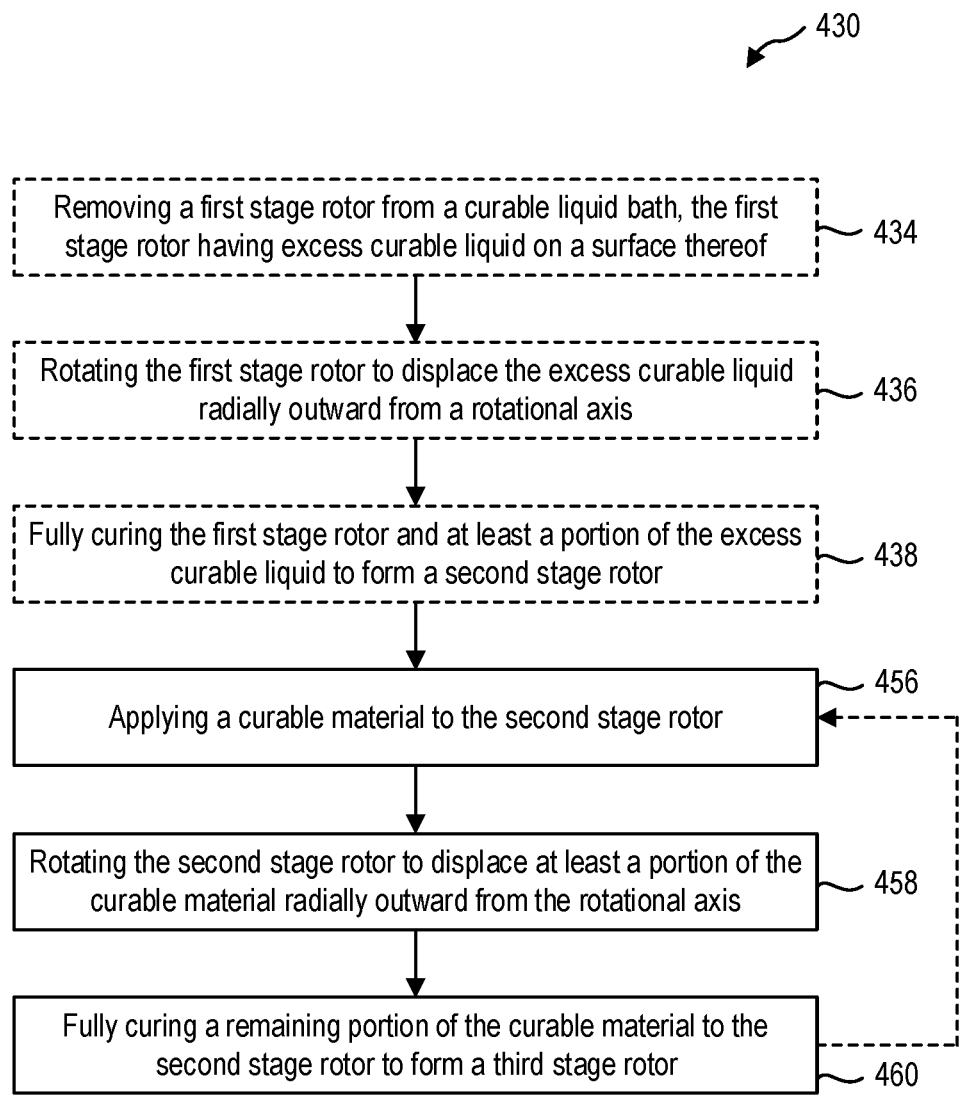
FIG. 7 is a flowchart illustrating another method of manufacturing a balanced impeller rotor.

FIG. 7 is a flowchart illustrating an implementation of another method 430 of manufacturing an impeller rotor, according to the present disclosure. The method 430 optionally includes a plurality of curing steps for the first stage rotor and the second stage rotor. The method 430 includes a plurality of balancing iterations. In some implementations, the method 430 includes removing a first stage rotor from a curable liquid bath, where the first stage rotor has excess curable liquid on a surface thereof at 434. In some implementations, the first stage rotor is similar to any of the implementations of a first stage rotor described in relation to FIG. 3 through FIG. 6.

In some implementations, the first stage rotor includes or is made of a different material than the curable liquid. In some examples, the first stage rotor includes or is made of a metal or metal alloy. In at least one example, the first stage rotor is additively manufactured by selective laser melting (SLM) and/or selective laser sintering (SLS) of a metal or thermoplastic powder. In yet other examples, the first stage rotor includes or is made of a different resin or epoxy by DLP or SLA. The first stage rotor is then submerged in the curable liquid bath before being removed from the curable liquid bath at 434.

In some implementations, the method 430 further includes rotating the first stage rotor to displace the excess curable liquid radially outward from a rotational axis at 436 and fully curing the first stage rotor and at least a portion of the excess curable liquid to form a second stage rotor at 438, similar to as described in relation to FIG. 3.

In some implementations, DLP and SLA processes produce a part that is adhered to a build plate and removing the part from the plate can cause damage to the part. In some implementations, a base rotor material with greater elasticity and high elongation prior to breakage are more easily removed from the build platform. However, elasticity of a final rotor is detrimental to holding the designed lattice size and shape under rotational forces in use. In some implementations, the curable resin of the first stage rotor exhibits elasticity only in the "green" state, after the initial cure. Upon final cure the elasticity is diminished, producing increased stiffness in the final rotor.

In some implementations, the curable resin of the first stage rotor exhibits a substantially constant elasticity from the green state through and after a final cure. After the initial cure to produce the green state rotor, a second resin or different material (such as a metal or thermoplastic base material) is applied to the green state or first stage rotor. The second material of the curable liquid bath forms a shell around the first rotor and impart or augment the stiffness required for the final rotor.

In some implementations, the curable resin may be modified by dilution in a solvent, or in combination with a filler, to alter the viscosity of the curable resin making it more suitable for balancing or strengthening the final part.

In some implementations, acts 434, 436, and 438 may be optional to the method 430. For example, the second stage rotor may be any precursor rotor formed by any process. In some examples, the precursor rotor may be formed by SLM or SLS of a metal or thermoplastic powder. In another example, the precursor rotor may be formed and fully cured without a balancing step. In some examples, the precursor rotor is a frame that is submerged has curable material applied thereto.

The method 430 includes applying a curable material to the second stage rotor or precursor rotor at 456 to improve the balance of the rotor. In implementations where one or more of acts 434, 436, and 438 are performed, the curable material that is applied is an additional curable material. In some implementations, the second stage rotor is more balanced than the first stage rotor but remains insufficiently balanced for the intended application. At least a second iteration of balancing the rotor with curable liquid improves the balance of the second stage rotor.

In some implementations, the method 430 continues by rotating the second stage rotor or precursor rotor to displace at least a portion of the curable material radially outward from the rotational axis of the rotor at 458 and then fully curing a remaining portion of the curable liquid to the second stage rotor or precursor rotor to form a fully cured third stage rotor at 460. In some implementations, the application of curable material at 456, rotation of the rotor and curable material at 458 and curing the remaining portion of the curable material at 460 are repeated in additional iterations to balance the rotor.

Figure 8:
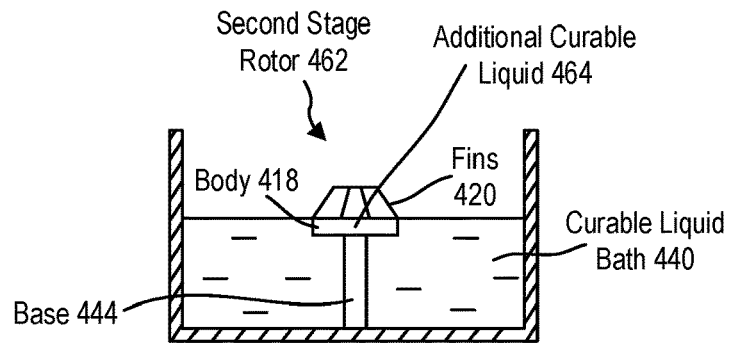
FIG. 8 is a schematic representation of applying additional curable material to the fully cured rotor of FIG. 6.

FIG. 8 is a schematic representation of a second stage rotor 462 positioned in a curable liquid bath 440. In some implementations, the same or a similar curable liquid bath 440 is used. In some implementations, the same or a similar base 444 and/or spindle is used to rotate the second stage rotor 462, similar to as described in relation to FIG. 5.

When positioned in the curable liquid bath 440, at least a portion of the body 418 and/or fins 420 of the second stage rotor 462 comes in contact with the curable liquid. In some implementations, the second stage rotor 462 is completely submerged in the curable liquid bath 440. In some implementations, the second stage rotor 462 is partially submerged in the curable liquid bath 440 with a portion of the second stage rotor 462 in the curable liquid bath 440 and another portion of the second stage rotor 462 out of the curable liquid bath 440. In some examples, a lower portion of the body 418 is placed in contact with the curable liquid bath 440 while the fins 420 remain out of the curable liquid bath 440. In some implementations, the additional curable liquid 464 is applied to the body 418 to balance the second stage rotor 462 without applying additional curable liquid 464 to the fins 420. In some examples, applying additional curable liquid 464 to the fins 420 alters airflow or fluid flow over the fins 420 and can affect performance of the thermal management device.

Figure 9:
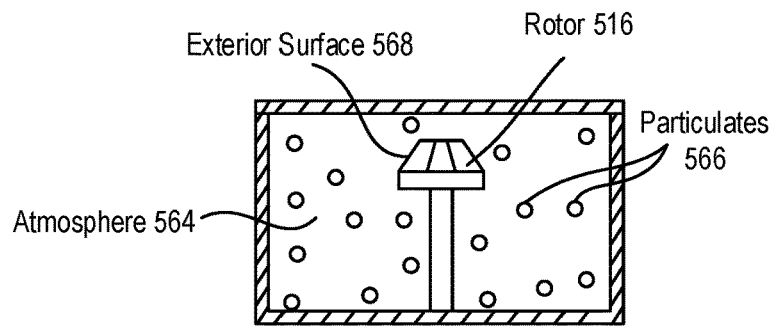
FIG. 9 is another schematic representation of applying additional curable material to a rotor or frame.

In some implementations, a coating or other material is applied to an exterior surface of the rotor 516, such as illustrated in FIG. 9. In some implementations, the rotor 516 is submerged in a material to apply a coating, such as described in relation to FIG. 8. In some implementations, the rotor 516 is exposed to an atmosphere 564 containing particulates 566, gas, or plasma that deposit the coating on an exterior surface 568 of the rotor 516.

In some implementations, the atmosphere 564 is a near-vacuum atmosphere that limits and/or prevents reaction of the particulates 566, gas, or plasma with other atoms or molecules in the atmosphere 564. In some implementations, the coating is deposited on the exterior surface 568 of the rotor 516 by vapor deposition. In some examples, the vapor deposition is physical vapor deposition (PVD). In other examples, the vapor deposition is chemical vapor deposition (CVD).

PVD is a process in which the material goes from a condensed phase to a vapor phase (e.g., particulates 566) and then back to a thin film condensed phase on the exterior surface 568 of the rotor 516. PVD includes processes such as sputtering and evaporation. In some implementations, such as sputtering, the application of the coating material is directional. When the particulates 566, gas, or plasma originates from a source and is directed toward the rotor 516, the rotor 516 is rotated to expose more or all of the exterior surface 568 to the sputtering stream.

In some implementations, such as evaporation illustrated in FIG. 9, the application of the coating material is approximately omnidirectional. In some implementations, the rotor 516 remains stationary relative to the atmosphere during evaporative PVD. In some implementations, the rotor 516 is rotated relative to the atmosphere during evaporative PVD.

CVD is a vacuum deposition method. The substrate (i.e., the rotor 516) is exposed to one or more volatile precursors, which react and/or decompose on the exterior surface 568 to produce the desired deposit.

Figure 10:
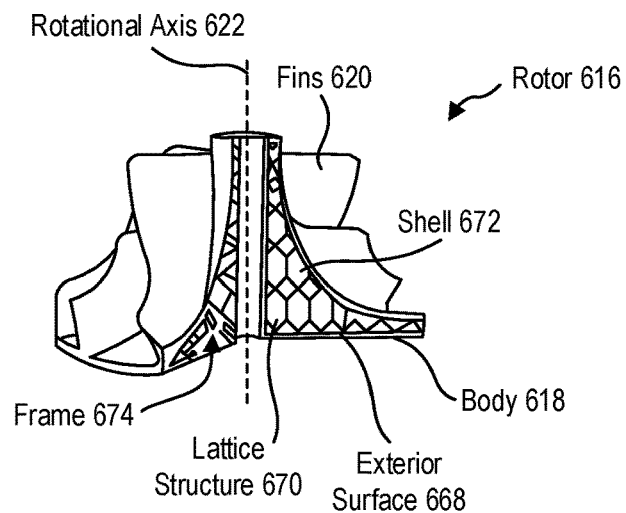
FIG. 10 is a cross-sectional view of the structure of an implementation of an impeller.

FIG. 10 is cross-sectional view of an implementation of a rotor 616 including a shell, according to the present disclosure. In some implementations, at least a portion of the body 618 and/or fins 620 includes a lattice structure 670. As described herein, the lattice structure 670 is a regular lattice in some implementations. In some implementations, at least a portion of the lattice structure 670 is a stochastic lattice. In some examples, the lattice structure 670 is a simple cubic structure. In other examples, the lattice structure 670 is a body-centered cubic structure. In yet other examples, the lattice structure 670 is a face-centered cubic structure. In further examples, the lattice structure 670 is a columnar structure. In yet further examples, the lattice structure 670 is a hexagonal structure. In some implementations, the body 618 and fins 620 have an exterior surface 668 upon which a shell 672 is positioned.

In some implementations, the body 618 and fins 620 or lattice structure for rotors 616 that do not include fins 620 form a frame 674 of the rotor 616. The frame 674 is manufactured and balanced according to any method or combination of methods described herein, and a shell 672 is applied to the frame 674 to provide a continuous exterior surface. In some implementations, the frame 674 and shell 672 include the same material. In some implementations, the frame 674 and shell 672 are different materials. In some implementations, the frame 674 includes a plurality of materials (such as body material and a different frame material) and the shell 672 includes at least one of the plurality of materials. In some implementations, the frame 674 includes a plurality of materials (such as body material and a different frame material) and the shell 672 includes a different material from the plurality of materials.

In some implementations, at least a portion of the shell 672 is a balancing material. In some examples, the frame 674 is radially imbalanced relative to the rotational axis 622 of the rotor 612. The shell 672 is therefore radially imbalanced relative to a rotational axis 622 of the rotor 612 to compensate for the radial imbalance of the frame 674. In at least one implementation, the frame 674 is the first stage rotor and the balancing material and/or shell 672 is formed of excess curable liquid that is cured to adhere to the frame 674.

INDUSTRIAL APPLICABILITY

This disclosure generally relates to systems and methods for manufacturing a rotor. More particularly, the present disclosure relates to the manufacture of an impeller rotor to move air or another fluid in a thermal management device. In some implementations, the method includes additively manufacturing a first stage rotor in a curable liquid bath by partially curing the curable liquid in layers. The excess curable liquid that remains on the first stage rotor after removing the first stage rotor from the curable liquid bath is used to balance the first stage rotor instead of washing the curable liquid off, drying the first stage rotor, and subsequently removing material to balance the rotor.

In some implementations, a frame of the rotor is formed and submerged into a curable liquid bath. The curable liquid that remains on the frame after removing the frame from the curable liquid bath is used to balance the rotor.

In some implementations, an electronic device including an active thermal management device is a portable electronic device, such as a laptop, a smartphone, a tablet computer, a hybrid computer, a wearable electronic device (e.g., a head-mounted device, a smartwatch, headphones) or other portable electronic device. In some implementations, the electronic device is an electronic device that is conventionally operated in a fixed location, such as a television, home theater, desktop computer, server computer, projector, optical disc player (e.g., CD player, DVD player, BLURAY player), video game console, or other electronic device.

The electronic device can include a first portion and a second portion movably connected to one another. In implementations in which the electronic device is a hybrid computer, the first portion includes the display and at least a processor. In some implementations, a processor is located in the second portion. In some implementations, the first portion of the electronic device includes a display to present video information to a user and the second portion of the electronic device includes one or more input devices, such as a trackpad, a keyboard, etc., to allow a user to interact with the electronic device. The electronic device further includes additional computer components, such as system memory, a graphical processing unit, graphics memory, speakers, one or more communication devices (such as WIFI, BLUETOOTH, near-field communications, cellular), peripheral connection points, hardware storage device(s), etc. In some implementations, the first portion is removable from the second portion.

The electronic components of an electronic device, in particular the display, input device, processor, memory, and batteries, occupy volume, consume power, and generate thermal energy. In some examples, it is desirable that the electronic devices be thin and light for transport, while remaining powerful and efficient during use. The thermal energy generated by the electronic device, therefore, has little unobstructed volume inside the first portion and/or second portion through which air can flow. In some implementations, an active thermal management device with an impeller is used to actively move air in, out, or through the first portion and/or second portion to exhaust warm air from vents.

An impeller rotor from a thermal management device in an electronic device has a body and a plurality of fins that project from the body. The rotor is configured to rotate about a rotational axis. In some implementations, rotation of the rotor around the rotational axis draws air or other fluid past the body and fins as the fins move. In some examples, the fins draw the fluid in through a top of the rotor and the fins and body combine to direct the fluid out the side of the rotor. In other example, the fins draw the fluid in through a top of the rotor and the fins and body combine to direct the fluid out the bottom of the rotor opposite the top.

In some implementations, a rotor is built by additive manufacturing. For example, a rotor is "printed" by applying and solidifying layers of material through many iterations, with each printed layer changing to cumulatively build the desired shape. Additive manufacturing allows new fan geometries that were previously impossible or unviable by conventional manufacturing methods such as injection molding or subtractive machining. Additive manufacturing of the rotor allows fan impeller shapes with undercuts, overhangs, textures, and complex lattice structures that would result in a die-locked mold (using injection molding) or inaccessible features that cannot be machined (such as using CNC machining).

In some implementations, the rotor is at least partially formed using DLP or SLA. In some examples, the body and fins are additively manufactured on a substrate. In other examples, the fins are additively manufactured on a body that is manufactured by another process, such as injection molding and/or machining. Additive manufacturing can leave an uneven surface and/or an imbalanced rotor that needs to be smoothed and/or balanced before use in a thermal management device or other application.

In some implementations, DLP and SLA printers solidify a rotor layer by layer using controlled UV light and a bath of photocurable liquid resin or other curable material. The resulting component emerges from the process coated in excess curable material. Conventionally, the excess curable material is washed away with a solvent and then the part is exposed to a high intensity UV light to finally cure any remaining uncured resin on the part. Removing the excess curable material from an SLA or DLP part by solvent washing is costly and wasteful. By using the waste surface resin to balance the impeller, the processing time and cost of the part are reduced.

In some implementations, a method of manufacturing an impeller rotor for a thermal management device includes partially curing a curable liquid in a curable liquid bath to form a first stage rotor. In some examples, the first stage rotor is formed by DLP or SLA of a curable liquid. In some implementations, the curable liquid is a cross-linking resin. In some implementations, the curable liquid is a urethane. In some implementations, the curable liquid is an epoxy. In at least one implementation, the curable liquid is a cyanate ester. Partially curing the curable liquid includes curing the curable liquid to a state less than a full cure.

In some implementations, partially curing the curable liquid includes exposing the curable liquid to an energy source for less than ten seconds. In some implementations, partially curing the curable liquid includes exposing the curable liquid to an energy source for less than five seconds. In some implementations, partially curing the curable liquid includes exposing the curable liquid to an energy source for less than three seconds.

In some implementations, the energy source for partially curing the curable liquid is ultraviolet light. In some implementations, the energy source for partially curing the curable liquid is infrared light. In some implementations, the energy source for partially curing the curable liquid is laser light.

In some implementations, the first stage rotor is solid. In some implementations, the first stage rotor has a lattice structure through at least a portion of the interior volume of the body and/or fins. In some examples, the body has a lattice structure therein, while the fins are solid material with little or no voids in the material. In other examples, the body and fins have a lattice structure therein. In yet other examples, the body and fins are solid material with little or no void in the material. In further examples, the body has a lattice structure with at least 10% voids, while the fins are solid material with less than 10% voids. In at least one example, the body has a lattice structure with at least 50% voids, while the fins are solid material with less than 5% voids. In some examples, the rotor has no traditional fins and includes a volume of lattice structure that is exposed to flow air when the lattice structure is rotated around an axis. In some examples, the rotor includes a body and a single lattice structure positioned on the body In some implementations, the lattice is a regular lattice. For example, the regular lattice repeats throughout at least a portion of the first stage rotor in a unit cell. In some implementations, the lattice is a stochastic lattice. For example, the lattice includes struts, where the strut length and/or orientation is at least partially random with respect to adjacent or neighboring struts.

The method further includes removing the first stage rotor from the curable liquid bath, while the first stage rotor has excess curable liquid on an exterior surface of the first stage rotor. In some implementations, excess curable liquid from the curable liquid bath is cohesively adhered to an exterior surface of the first stage rotor. In some implementations, excess curable liquid from the curable liquid bath is cohesively adhered to an exterior surface of at least some of the struts of the lattice of the first stage rotor.

The excess curable liquid is conventionally washed from the first stage rotor prior to balancing. The method according to the present disclosure balances the first stage rotor using a portion of the excess curable liquid by rotating the first stage rotor to displace the excess curable liquid radially outward from a rotational axis.

The excess curable liquid is conventionally washed from the first stage rotor prior to balancing. The method according to the present disclosure balances the first stage rotor using a portion of the excess curable liquid by rotating the first stage rotor to displace the excess curable liquid radially outward from a rotational axis. In some implementations, the first stage rotor is rotated around a rotational axis such that a radially outermost edge of the first stage rotor rotates in a range having an upper value, a lower value, or upper and lower values including any of 1 meter per second (m/s), 5 m/s, 10 m/s, 20 m/s, 30 m/s, 40 m/s, 50 m/s, 60 m/s, or any values therebetween. In some examples, the radially outermost edge of the first stage rotor rotates at greater than 1 m/s. In other examples, the radially outermost edge of the first stage rotor rotates at less than 60 m/s. In yet other examples, the radially outermost edge of the first stage rotor rotates at between 1 m/s and 60 m/s. In further examples, the radially outermost edge of the first stage rotor rotates at between 5 m/s and 50 m/s. In yet further examples, the radially outermost edge of the first stage rotor rotates at between 10 m/s and 40 m/s.

The linear speed of the outermost edge is relative to the rotational speed and the diameter of the first stage rotor. In some implementations, a first stage rotor according to the present disclosure has a diameter in a range having an upper value, a lower value, or upper and lower values including any of 40 millimeters, 60 mm, 80 mm, 100 mm, 120 mm, 140 mm, or any values therebetween. In some examples, the diameter is greater than 40 mm. In other examples, the diameter is less than 140 mm. In yet other examples, the diameter is between 40 mm and 140 mm.

In some implementations, the rotational speed of the first stage rotor rotating around the rotational axis is 300 revolutions per minute (RPM), 1000 RPM, 2500 RPM, 5000 RPM, 7500 RPM, 10000 RPM, 12500 RPM, 15000 RPM, or any values therebetween. In some examples, a rotational speed of the first stage rotor rotating around the rotational axis is greater than 300 RPM. In other examples, a rotational speed of the first stage rotor rotating around the rotational axis is less than 15000 RPM. In yet other examples, a rotational speed of the first stage rotor rotating around the rotational axis is between 300 RPM and 15000 RPM. In further examples, a rotational speed of the first stage rotor rotating around the rotational axis is between 500 RPM and 12000 RPM. In yet further examples, a rotational speed of the first stage rotor rotating around the rotational axis is between 1000 RPM and 10000 RPM.

In some implementations, the first stage rotor is rotated around the rotation axis to spin the excess fluid radially outward and balance the first stage rotor by distributing the excess curable fluid across an exterior surface and/or within the lattice of the first stage rotor. In some implementations, the first stage rotor is rotated around the rotation axis continuously until the first stage rotor is rotationally balanced relative to the rotational axis. In some implementations, the first stage rotor is rotated in pulses until the first stage rotor is rotationally balanced relative to the rotational axis. In some implementations, the first stage rotor is rotated at varying rotational speeds until the first stage rotor is rotationally balanced relative to the rotational axis.

In some examples, the first stage rotor is positioned on a spindle or base when rotated around the rotational axis. In some implementations, the spindle and/or base has a pressure sensor positioned therein to measure any lateral force in a lateral direction relative to the rotational axis. When the first stage rotor is balanced relative to the rotational axis, the force sensor will read approximately zero lateral force. In some examples, a displacement sensor, such as a laser displacement sensor measures a displacement of the rotor relative to the rotational axis. When the first stage rotor is balanced relative to the rotational axis, the displacement sensor will read approximately zero lateral displacement.

When the first stage rotor is rotationally balanced within a threshold, the remaining excess curable material is cured in place with the material of the first stage rotor.

The method further includes fully curing the first stage rotor and at least a portion of the excess curable liquid. In some implementations, the rotation of the rotor is stopped before fully curing the first stage rotor and at least a portion of the excess curable liquid. In some implementations, the first stage rotor and at least a portion of the excess curable liquid continue to rotate around the rotational axis while an energy source applies energy to the first stage rotor and at least a portion of the excess curable liquid to fully cure the first stage rotor and at least a portion of the excess curable liquid.

In some implementations, fully curing the first stage rotor and the remaining excess curable liquid includes exposing the first stage rotor and the remaining excess curable liquid to an energy source. In some implementations, the energy source is the same energy source used to partially cure the first stage rotor. In some examples, the fully curing the first stage rotor and the remaining excess curable liquid includes exposing the first stage rotor and the remaining excess curable liquid to an energy source for at least ten seconds. In other examples, fully curing the first stage rotor and the remaining excess curable liquid includes exposing the first stage rotor and the remaining excess curable liquid to an energy source for at least ten seconds from a first direction and at least ten seconds from a second direction.

In some implementations, the energy source used to fully cure the first stage rotor and the remaining excess curable liquid into the second stage rotor is a different energy source. In some examples, the energy source used to fully cure the first stage rotor and the remaining excess curable liquid is an ultraviolet light source. In other examples, the energy source is an infrared light source. In yet other examples, the energy source is a laser light source. In further examples, the energy source is a thermal energy source, such as a heat lamp. In some implementations, the first stage rotor and the remaining excess curable liquid fully cure in exposure to air or another gas.

In some implementations, fully curing the first stage rotor and the remaining excess curable liquid creates a second stage rotor that is solid and balanced. In some examples, the second stage rotor is a finished rotor. In some implementations, the second stage rotor has one or more coatings, parts, or other components affixed thereto to create a finished rotor.

In some implementations, DLP and SLA processes produce a part that is adhered to a build plate and removing the part from the plate can cause damage to the part. In some implementations, a base rotor material with greater elasticity and high elongation prior to breakage are more easily removed from the build platform. However, elasticity of a final rotor is detrimental to holding the designed lattice size and shape under rotational forces in use. In some implementations, the curable resin of the first stage rotor exhibits elasticity only in the "green" state, after the initial cure. Upon final cure the elasticity is diminished, producing increased stiffness in the final rotor.

In some implementations, the curable resin of the first stage rotor exhibits a substantially constant elasticity from the green state through and after a final cure. After the initial cure to produce the green state rotor, a second resin or different material (such as a metal or thermoplastic base material) is applied to the green state or first stage rotor. The second material of the curable liquid bath forms a shell around the first rotor and impart or augment the stiffness required for the final rotor.

In some implementations, the curable resin may be modified by dilution in a solvent, or in combination with a filler, to alter the viscosity of the curable resin making it more suitable for balancing or strengthening the final part.

In some implementations, the body and/or fins of the rotor are manufactured from the curable liquid bath by exposure of the curable liquid to an energy source, such as an ultraviolet light source, an infrared light source, or a laser light source. The body and fins are partially cured to create the first stage rotor, as described herein.

In some implementations, the rotor is removed from the curable liquid bath by raising the rotor on a base or spindle above a surface of the curable liquid bath. The base or spindle is rotatable around a rotational axis that is shared with the rotor, rotating the rotor in a rotational direction.

In some implementations, the rotation of the rotor around the rotational axis displaces at least a portion of excess curable liquid from the rotor. The rotation movement of the rotor and excess curable liquid applies a radially outward force to the excess curable liquid relative to the rotational path of the rotor. In some implementations, the radially outward force displaces at least a portion of the excess curable liquid in or on the rotor and at least a portion of the excess curable liquid is removed from the rotor.

A portion of the excess curable liquid, therefore, can be removed without washing the rotor in a solvent. In some implementations, the excess curable liquid that is removed by rotating the rotor is collected and reused. In some examples, the rotor is rotated above the curable liquid bath and the excess curable liquid that is removed from the rotor falls back into the curable liquid bath. After the rotor is balanced by the remaining excess curable liquid, the rotor and remaining excess curable liquid are ready to be fully cured.

In some implementations, fully curing the rotor and the remaining excess curable liquid includes exposing the rotor and the remaining excess curable liquid to a full cure energy source. In some implementations, the full cure energy source is the same energy source used to partially cure the first stage rotor. In some implementations, the full cure energy source used to fully cure the rotor and the remaining excess curable liquid into the second stage rotor is a different energy source. In some examples, the full cure energy source is an ultraviolet light source. In other examples, the full cure energy source is an infrared light source. In yet other examples, the full cure energy source is a laser light source. In further examples, the full cure energy source is a thermal energy source, such as a heat lamp, that applies a thermal energy to the rotor and remaining excess curable liquid. In some implementations, the rotor and the remaining excess curable liquid fully cure in exposure to air or another gas.

In some implementations, fully curing the first stage rotor and the remaining excess curable liquid creates a second stage rotor that is solid and balanced. In some examples, the second stage rotor is a finished rotor. In some implementations, the second stage rotor has one or more coatings, parts, or other components affixed thereto to create a finished rotor. In some examples, the second stage rotor is balanced to within an intermediate threshold, and subsequent balancing improves the balance.

In some implementations, a method of manufacturing a rotor includes a plurality of balancing iterations. In some implementations, the method includes removing a first stage rotor from a curable liquid bath, where the first stage rotor has excess curable liquid on a surface thereof. In some implementations, the first stage rotor is similar to any of the implementations of a first stage rotor described herein.

In some implementations, the first stage rotor includes or is made of a different material than the curable material. In some examples, the first stage rotor includes or is made of a metal or thermoplastic. In at least one example, the first stage rotor is additively manufactured by SLM and/or SLS of a metal or thermoplastic powder. In yet other examples, the first stage rotor includes or is made of a different resin or epoxy by DLP or SLA. The first stage rotor is then submerged in the curable liquid bath before being removed from the curable liquid bath.

In some implementations, the method further includes rotating the first stage rotor to displace the excess curable liquid radially outward from a rotational axis and fully curing the first stage rotor and at least a portion of the excess curable liquid, similar to as described herein. The method includes applying additional curable material to the second stage rotor to further balance the rotor. In some implementations, the second stage rotor is more balanced than the first stage rotor but remains insufficiently balanced for the intended application. At least a second iteration of balancing the rotor with curable liquid improves the balance of the second stage rotor.

In some implementations, the method continues by rotating the second stage rotor or a precursor rotor to displace at least a portion of the curable material radially outward from the rotational axis of the rotor and then fully curing a remaining portion of the curable liquid to the second stage rotor (which was previously partially or fully cured) or precursor rotor to form a fully cured third stage rotor. In some implementations, the application of curable material, rotation of the rotor and curable material, and curing the remaining portion of the curable material are repeated in additional iterations to balance the rotor.

In some implementations, the same or a similar curable liquid bath is used in subsequent iterations of balancing a rotor. In some implementations, the same or a similar base and/or spindle is used to rotate the second stage rotor.

When positioned in the curable liquid bath, at least a portion of the body and/or fins of the second stage rotor comes in contact with the curable liquid. In some implementations, the second stage rotor is completely submerged in the curable liquid bath. In some implementations, the second stage rotor is partially submerged in the curable liquid bath with a portion of the second stage rotor in the curable liquid bath and another portion of the second stage rotor out of the curable liquid bath. In some examples, a lower portion of the body is placed in contact with the curable liquid bath while the fins remain out of the curable liquid bath. In some implementations, the additional curable liquid is applied to the body to balance the second stage rotor without applying additional curable liquid to the fins. In some examples, applying additional curable liquid to the fins alters airflow or fluid flow over the fins and can affect performance of the thermal management device.

In some implementations, a coating or other material is applied to an exterior surface of the rotor. In some implementations, the rotor is submerged in a material to apply a coating. In some implementations, the rotor is exposed to an atmosphere containing particulates, gas, or plasma that deposit the coating on an exterior surface of the rotor.

In some implementations, the atmosphere is a near-vacuum atmosphere that limits and/or prevents reaction of the particulates, gas, or plasma with other atoms or molecules in the atmosphere. In some implementations, the coating is deposited on the exterior surface of the rotor by vapor deposition. In some example, the vapor deposition is physical vapor deposition (PVD). In other examples, the vapor deposition is chemical vapor deposition (CVD).

PVD is a process in which the material goes from a condensed phase to a vapor phase (e.g., particulates) and then back to a thin film condensed phase on the exterior surface of the rotor. PVD includes processes such as sputtering and evaporation. In some implementations, such as sputtering, the application of the coating material is directional. When the particulates, gas, or plasma originates from a source and is directed toward the rotor, the rotor is rotated to expose more or all of the exterior surface to the sputtering stream.

In some implementations, such as evaporation, the application of the coating material is approximately omnidirectional. In some implementations, the rotor remains stationary relative to the atmosphere during evaporative PVD. In some implementations, the rotor is rotated relative to the atmosphere during evaporative PVD.

CVD is a vacuum deposition method. The substrate (i.e., the rotor) is exposed to one or more volatile precursors, which react and/or decompose on the exterior surface to produce the desired deposit.

In some implementations, at least a portion of the body and/or fins includes a lattice structure. As described herein, the lattice structure is a regular lattice in some implementations. In some implementations, at least a portion of the lattice structure is a stochastic lattice. In some examples, the lattice structure is a simple cubic structure. In other examples, the lattice structure is a body-centered cubic structure. In yet other examples, the lattice structure is a face-centered cubic structure. In further examples, the lattice structure is a columnar structure. In yet further examples, the lattice structure is a hexagonal structure. In some implementations, the body and fins have an exterior surface upon which a coating is positioned.

In some implementations, the body and fins form a frame of the rotor. In some implementations without conventional fins, the body and lattice structure form a frame. The frame is manufactured and balanced according to any method or combination of methods described herein, and a shell is applied to the frame to provide a continuous exterior surface. In some implementations, the frame and shell include the same material. In some implementations, the frame and shell are different materials. In some implementations, the frame includes a plurality of materials (such as body material and a different frame material) and the shell includes at least one of the plurality of materials. In some implementations, the frame includes a plurality of materials (such as body material and a different frame material) and the shell includes a different material from the plurality of materials.

In some implementations, at least a portion of the shell is a balancing material. In some examples, the frame is radially imbalanced relative to the rotational axis of the rotor. The shell is therefore radially imbalanced relative to a rotational axis of the rotor to compensate for the radial imbalance of the frame. In at least one implementation, the frame is the first stage rotor and the balancing material and/or shell is formed of excess curable liquid that is cured to adhere to the frame.

In at least one implementation, a method of manufacturing an impeller rotor includes additively manufacturing a first stage rotor and using the same materials for the initial additive manufacturing to balance the rotor before fully curing the rotor. By using the same materials and sharing processes, the rotors can be manufactured more efficiently than through a conventional forming of the rotor and subtractive balancing process.

The present disclosure relates to systems and methods for manufacturing a rotor according to at least the examples provided in the sections below:
1. A method for manufacturing an impeller for a thermal management device:
    partially curing (e.g., "partially curing . . . " 332, FIG. 3) a curable liquid in a curable liquid bath (e.g., curable liquid bath 440, FIG. 4) to form a first stage rotor (e.g., rotor 416, FIG. 4);
    removing (e.g., "removing . . . " 334, FIG. 3) the first stage rotor from the curable liquid bath, the first stage rotor having excess curable liquid (e.g., excess curable liquid 448, FIG. 5) on a surface thereof;
    rotating (e.g., "rotating . . . " 336, FIG. 3) the first stage rotor to displace the excess curable liquid radially outward from a rotational axis to compensate for imbalances in the first stage rotor; and
    fully curing (e.g., "fully curing . . . " 338, FIG. 3) the first stage rotor and at least a portion of the excess curable liquid to produce a second stage rotor (e.g., rotor 416, FIG. 6) that is more rotationally balanced than the first stage rotor.
2. The method of section 1, wherein partially curing the curable liquid comprises exposing the curable liquid to a particular wavelength of light (e.g., energy source 442, FIG. 4).
3. The method of section 1 or 2, wherein fully curing the first stage rotor and at least a portion of the excess curable liquid comprises fully curing the first stage rotor and at least a portion of the excess curable liquid while rotating the first stage rotor and at least a portion of the excess curable liquid.
4. The method of any of sections 1-3, wherein fully curing the curable liquid includes exposing the curable liquid to a thermal energy source (e.g., full cure energy source 452, FIG. 6).
5. The method of any of sections 1-4, wherein fully curing the curable liquid includes exposing the curable liquid to ultraviolet light.
6. The method of any of sections 1-5, wherein the first stage rotor includes a lattice structure (e.g., lattice structure 319, FIG. 2-2).
7. The method of claim 6, wherein the lattice structure is a stochastic lattice (e.g., lattice structure 319, FIG. 2-2).
8. The method of any of sections 1-7, wherein the curable liquid includes a cross-linking polymer.
9. The method of any of sections 1-8, wherein between removing the first stage rotor from the curable liquid bath and rotating the first stage rotor no solvent is applied to the first stage rotor.
10. A method for manufacturing an impeller for a thermal management device, the method comprising:
    obtaining (e.g., "obtaining . . . " 456, FIG. 7) a precursor rotor coated in a curable material;
    rotating (e.g., "rotating . . . " 458, FIG. 7) the precursor rotor and curable material to displace at least a portion of the curable material radially outward from the rotational axis to compensate for radial imbalances in the precursor rotor; and
    curing (e.g., "curing . . . " 460, FIG. 7) the displaced portion of the curable material to the precursor rotor to form a second stage rotor, wherein the second stage rotor has better radial balance than the precursor rotor.
11. The method of section 10, wherein the precursor rotor includes a metal or thermoplastic.
12. The method of section 10 or 11, wherein obtaining the precursor rotor (e.g., second stage rotor 462, FIG. 8) coated in the curable material (e.g., curable material 464, FIG. 8) comprises submerging a frame composed of a metal or thermoplastic into a curable liquid bath (e.g., curable liquid bath 440, FIG. 8).
13. The method of any of sections 10-12 further comprising additively manufacturing the frame before submerging the frame.
14. The method of any of sections 10-13, wherein obtaining a precursor rotor coated in the curable material includes submerging at least a portion of the precursor rotor in the curable liquid bath.
15. The method of any of sections 10-14, wherein obtaining a precursor rotor coated in the curable material includes applying the curable material to the precursor rotor while rotating the precursor rotor.

16. The method of any of sections 10-15, wherein obtaining a precursor rotor coated a curable material includes applying the additional curable material by vapor deposition.

17. An impeller for use in a thermal management device, the impeller comprising:
    a frame (e.g., frame 674, FIG. 10) having a lattice structure (e.g., lattice structure 670, FIG. 10) and a rotational axis (e.g., rotational axis 622, FIG. 10); and
    a balancing material (e.g., curable liquid 448, FIG. 5; shell 672, FIG. 10) positioned on an exterior surface (e.g., exterior surface 668, FIG. 10) of the frame, the balancing material being distributed unevenly relative to the rotational axis so as to compensate for radial imbalances in the lattice structure.

18. The impeller of section 17, wherein the frame is radially imbalanced relative to the rotational axis.

19. The impeller of sections 17 or 18, wherein the balancing material is the same material as the frame.

20. The impeller of any of sections 17-19, wherein the balancing material covers all of the exterior surface of the frame, the balancing material varying in thickness on the exterior surface of the frame.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for manufacturing an impeller for a thermal management device, the method comprising:
    partially curing a curable liquid in a curable liquid bath to form a first stage rotor;
    removing the first stage rotor from the curable liquid bath, the first stage rotor having excess of the curable liquid cohesively adhered on a surface thereof;
    while the excess of the curable liquid is cohesively adhered, rotating the first stage rotor to displace the excess of the curable liquid radially outward from a rotational axis to compensate for imbalances in the first stage rotor; and
    fully curing the first stage rotor and at least a portion of the excess of the curable liquid to produce a second stage rotor that is more rotationally balanced than the first stage rotor.

2. The method of claim 1, wherein partially curing the curable liquid comprises exposing the curable liquid to a particular wavelength of light.

3. The method of claim 1, wherein fully curing the first stage rotor and at least a portion of the excess curable liquid comprises fully curing the first stage rotor and at least a portion of the excess curable liquid while rotating the first stage rotor and at least a portion of the excess curable liquid.

4. The method of claim 1, wherein fully curing the curable liquid includes exposing the curable liquid to a thermal energy source.

5. The method of claim 1, wherein fully curing the curable liquid includes exposing the curable liquid to ultraviolet light.

6. The method of claim 1, wherein the first stage rotor includes a lattice structure.

7. The method of claim 6, wherein the lattice structure is a stochastic lattice.

8. The method of claim 1, wherein the curable liquid includes a cross-linking polymer.

9. The method of claim 1, wherein between removing the first stage rotor from the curable liquid bath and rotating the first stage rotor no solvent is applied to the first stage rotor.

10. A method for manufacturing an impeller for a thermal management device, the method comprising:
    positioning a precursor rotor into a curable liquid of a curable liquid bath;
    partially curing the curable liquid over the precursor rotor in the curable liquid bath to form a first stage rotor;
    removing the first stage rotor from the curable liquid bath, the first stage rotor having excess of the curable liquid cohesively adhered on a surface thereof;

while the excess of the curable liquid is cohesively adhered, rotating the first stage rotor and the excess of the curable liquid to displace at least a portion of the excess of the curable liquid radially outward from a rotational axis so as to compensate for radial imbalances in the first stage rotor; and curing the displaced portion of the excess of the curable liquid to the first stage rotor to form a second stage rotor, wherein the second stage rotor has better radial balance than the first stage rotor.

11. The method of claim 10, wherein the precursor rotor includes a metal or thermoplastic.

12. The method of claim 10, wherein the precursor rotor coated is a frame composed of a metal or thermoplastic.

13. The method of claim 12 further comprising additively manufacturing the frame before positioning the precursor rotor into the curable liquid of a curable liquid bath.

14. The method of claim 10, wherein only a portion of the precursor rotor is submerged in the curable liquid bath.

15. The method of claim 10, wherein partially curing the curable liquid over the precursor rotor in the curable liquid bath to form a first stage rotor includes applying the curable liquid to the precursor rotor while rotating the precursor rotor.

16. The method of claim 10, further comprising applying additional curable material by vapor deposition.

17. An impeller for use in a thermal management device, the impeller comprising:

a frame having a lattice structure and a rotational axis formed according to the method of claim 1; and a balancing material cohesively adhered on an exterior surface of the frame, the balancing material being distributed unevenly relative to the rotational axis so as to compensate for radial imbalances in the lattice structure.

18. The impeller of claim 17, wherein the frame is radially imbalanced relative to the rotational axis.

19. The impeller of claim 17, wherein the balancing material is the same material as the frame.

20. The impeller of claim 17, wherein the balancing material covers all of the exterior surface of the frame, the balancing material varying in thickness on the exterior surface of the frame.

\* \* \* \* \*